(12) United States Patent
Yamashita et al.

(10) Patent No.: US 8,919,130 B2
(45) Date of Patent: Dec. 30, 2014

(54) GAS TURBINE CONTROL SYSTEM AND METHOD FOR SINGLE-SHAFT COMBINED CYCLE PLANT

(75) Inventors: Hidekazu Yamashita, Hyogo (JP); Shoichi Nagata, Hyogo (JP); Morihiko Masaki, Hyogo (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 1105 days.

(21) Appl. No.: 12/744,758

(22) PCT Filed: Apr. 27, 2009

(86) PCT No.: PCT/JP2009/058281
§ 371 (c)(1),
(2), (4) Date: May 26, 2010

(87) PCT Pub. No.: WO2009/133852
PCT Pub. Date: Nov. 5, 2009

(65) Prior Publication Data
US 2010/0301615 A1   Dec. 2, 2010

(30) Foreign Application Priority Data

Apr. 28, 2008   (JP) .................................. 2008-117428

(51) Int. Cl.
| F02C 9/00 | (2006.01) |
| F02C 6/00 | (2006.01) |
| F01K 23/16 | (2006.01) |
| F01K 23/10 | (2006.01) |
| F02C 9/28 | (2006.01) |
| F02C 6/18 | (2006.01) |
| F01K 13/02 | (2006.01) |

(52) U.S. Cl.
CPC . *F02C 6/18* (2013.01); *F01K 23/16* (2013.01); *Y02E 20/16* (2013.01); *F05D 2220/72* (2013.01); *F01K 23/101* (2013.01); *F02C 9/28* (2013.01); *F01K 13/02* (2013.01)
USPC ......................................... 60/773; 60/39.182

(58) Field of Classification Search
USPC ..... 60/39.182, 39.13, 793, 773; 122/7 R, 7 B
See application file for complete search history.

(56) References Cited

U.S. PATENT DOCUMENTS

| 4,532,761 A | * | 8/1985 | Takaoka et al. ............... 60/39.13 |
| 5,175,995 A | * | 1/1993 | Pak et al. .................... 60/39.182 |

(Continued)

FOREIGN PATENT DOCUMENTS

| EP | 1503047 A1 | 2/2005 |
| JP | 55-084805 A | 6/1980 |

(Continued)

OTHER PUBLICATIONS

International Search Report of Application No. PCT/JP2009/058281 mailed Aug. 11, 2009.

(Continued)

*Primary Examiner* — Gerald L Sung
(74) *Attorney, Agent, or Firm* — Manabu Kanesaka; Benjamin J. Hauptman (57) ABSTRACT

An object is to maintain a constant gas turbine output without requiring a complicated procedure on site and without being affected by variations in the output of a steam turbine during a reverse-washing/normal-washing switching period of a condenser. A gas turbine control system for a single-shaft combined cycle plant generates a gas turbine output command using a parameter reflecting a gas turbine output during a reverse-washing/normal-washing switching period of a condenser and generates the gas turbine output command on the basis of a generator output command and a steam turbine output during a period other than the reverse-washing/normal-washing switching period of the condenser.

3 Claims, 6 Drawing Sheets

(56) References Cited

U.S. PATENT DOCUMENTS

| | | | |
|---|---|---|---|
| 5,301,499 A * | 4/1994 | Kure-Jensen et al. | 60/773 |
| 5,794,431 A | 8/1998 | Utamura et al. | |
| 6,477,842 B1 * | 11/2002 | Nagata et al. | 60/772 |
| 2010/0281877 A1 * | 11/2010 | Asanaka et al. | 60/778 |

FOREIGN PATENT DOCUMENTS

| | | |
|---|---|---|
| JP | 03-279787 A | 12/1991 |
| JP | 2001-173410 A | 6/2001 |
| JP | 2003-343211 A | 12/2003 |

OTHER PUBLICATIONS

Extended European Search Report issued Oct. 21, 2014, corresponding to European patent application No. 09738789.8.

* cited by examiner

GAS TURBINE CONTROL SYSTEM AND METHOD FOR SINGLE-SHAFT COMBINED CYCLE PLANT

RELATED APPLICATIONS

The present application is based on International Application Number PCT/JP2009/058281, filed Apr. 27, 2009, and claims priority from Japanese Application Number 2008-117428, filed Apr. 28, 2008, the disclosures of which are hereby incorporated by reference herein in their entirety.

TECHNICAL FIELD

The present invention relates to a single-shaft combined cycle plant in which rotating shafts of a gas turbine, a steam turbine, and a generator are coupled together, and particularly to a gas turbine control system and method for output control of the gas turbine.

BACKGROUND ART

In a single-shaft combined cycle plant, when a condenser is switched between normal washing and reverse washing, the flow of sea water stops momentarily, with the result that the degree of vacuum of the condenser decreases suddenly. The decreased degree of vacuum of the condenser decreases the output of a steam turbine, thus causing a situation where the output of a generator decreases.

The steam turbine output is conventionally calculated with correction based on the degree of vacuum of the condenser, but if the degree of vacuum of the condenser changes suddenly, an instrument cannot follow the change in degree of vacuum, and the steam turbine output may be erroneously recognized to remain unchanged by calculation despite the fact that the steam turbine output has actually decreased.

In general, the generator output is calculated as the sum of the steam turbine output and the gas turbine output; as described above, so when the generator output decreases while the steam turbine output apparently remains unchanged as described above, the gas turbine output is erroneously recognized to have decreased. This prevents proper control of the gas turbine and poses the risk of malfunctions of various equipment in the power plant.

To eliminate this problem, therefore, Patent Literature 1, for example, discloses a gas turbine control system capable of more accurately calculating the steam turbine output and more precisely setting the gas turbine output by adding correction of the degree of opening of a condenser reverse washing valve to the calculation of the steam turbine output to compensate for a delay in response from an instrument measuring the degree of vacuum of a condenser by using the degree of opening of the condenser reverse washing valve.

CITATION LIST

Patent Literature

{PTL 1}
Japanese Unexamined Patent Application, Publication No. 2001-173410

SUMMARY OF INVENTION

Technical Problem

For the invention in Patent Literature 1 above, however, it is difficult to determine the setting for correction of the degree of opening of the condenser reverse washing valve used for correcting the steam turbine output, and repeated tests are needed on site to adapt the setting to the actual equipment, thus requiring a complicated procedure on site.

An object of the present invention is to provide a gas turbine control system and method, for a single-shaft combined cycle plant, that can maintain a constant gas turbine output without requiring a complicated procedure on site and without being affected by variations in the output of a steam turbine during a reverse-washing/normal-washing switching period of a condenser.

Solution to Problem

To solve the above problem, the present invention employs the following solutions.

A first aspect of the present invention provides a gas turbine control system for a single-shaft combined cycle plant including a gas turbine, a steam turbine, a generator, and a condenser for condensing exhaust steam from the steam turbine, the gas turbine, the steam turbine, and the generator have rotating shafts thereof coupled together, and the control system generates a gas turbine output command using a parameter reflecting the gas turbine output during a reverse-washing/normal-washing switching period of the condenser.

With this configuration, the output command for the gas turbine is determined using the parameter reflecting the output of the gas turbine without taking the output of the steam turbine into account during the reverse-washing/normal-washing switching period of the condenser, so that a constant gas turbine output can be maintained without requiring a complicated procedure on site and without being affected by variations in the output of the steam turbine during the reverse-washing/normal-washing switching period of the condenser.

The gas turbine control system for the single-shaft combined cycle plant, as described above, may include a first command-generating section for generating the gas turbine output command on the basis of a generator output and a steam turbine output, a second command-generating section for generating the gas turbine output command using the parameter reflecting the gas turbine output, and a selection section for selecting the second command-generating section during the reverse-washing/normal-washing switching period of the condenser and selecting the first command-generating section during a period other than the reverse-washing/normal-washing switching period of the condenser.

With this configuration, the gas turbine output command generated using the parameter reflecting the gas turbine output without taking the steam turbine output into account is selected during the reverse-washing/normal-washing switching period of the condenser, whereas the gas turbine output command generated on the basis of the generation output and the steam turbine output is selected during a period other than the reverse-washing/normal-washing switching period of the condenser. This enables control of the gas turbine with an optimum gas turbine output command depending on the washing status of the condenser.

The gas turbine control system for the single-shaft combined cycle plant, as described above, may employ a command value related to control of the amount of fuel supplied to a combustor or the inlet temperature of the gas turbine as the parameter reflecting the output of the gas turbine.

The present invention provides a gas turbine control method for a single-shaft combined cycle plant including a gas turbine, a steam turbine, a generator, and a condenser for condensing exhaust steam from the steam turbine, the gas turbine, the steam turbine, and the generator have rotating shafts thereof coupled together, and the control method includes generating a gas turbine output command using a parameter reflecting a gas turbine output during a reverse-washing/normal-washing switching period of the condenser.

Advantageous Effects of Invention

The present invention provides the advantage of maintaining a constant gas turbine output without requiring a complicated procedure on site and without being affected by variations in the output of the steam turbine during switching between reverse washing and normal washing.

DESCRIPTION OF EMBODIMENTS

An embodiment of a gas turbine control system and method for a single-shaft combined cycle plant according to the present invention will be described below with reference to the drawings.

Figure 1:
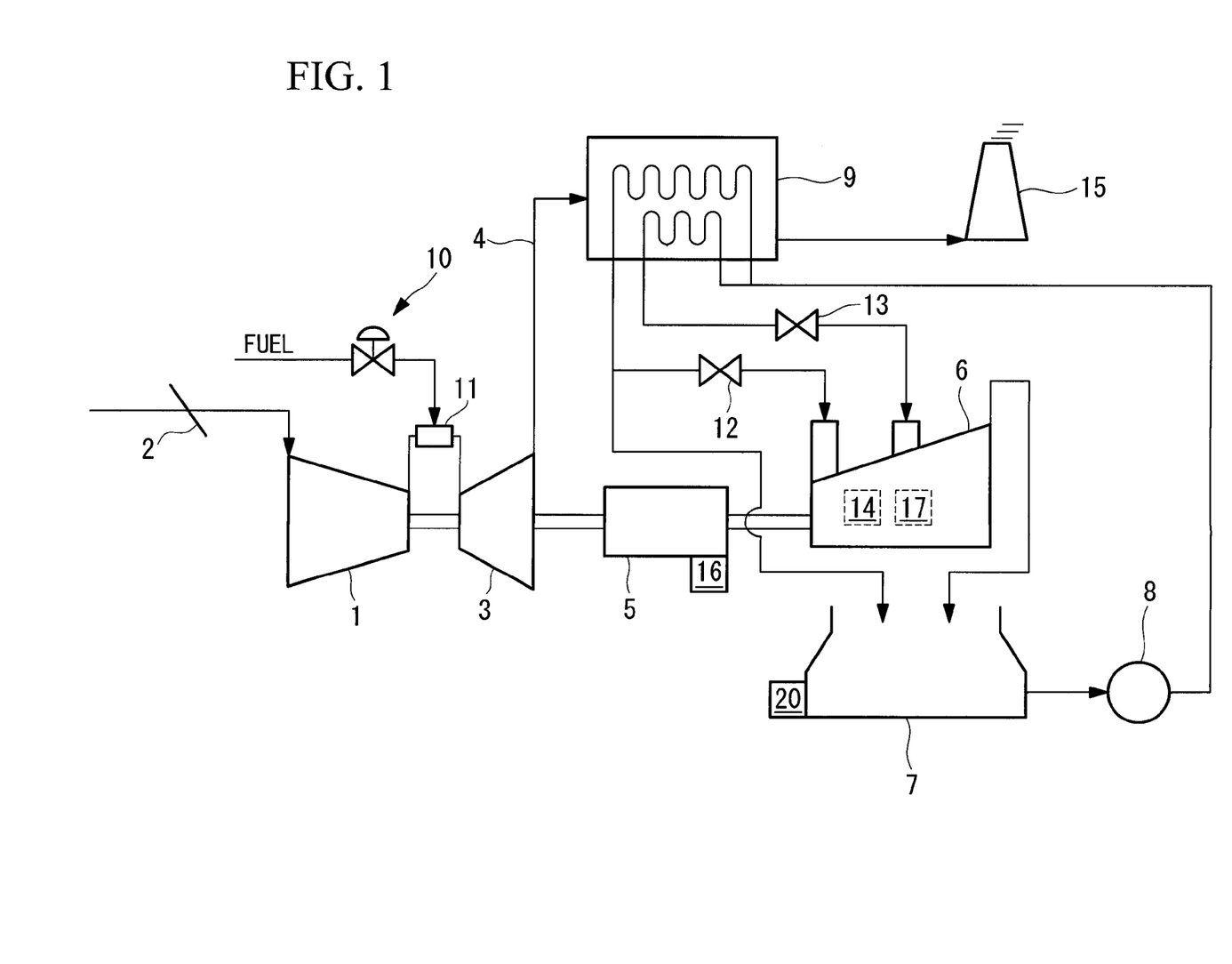
FIG. 1 is a schematic configuration diagram of a single-shaft combined cycle power plant according to an embodiment of the present invention.

FIG. 1 is a schematic configuration diagram of a single-shaft combined cycle power plant according to an embodiment of the present invention. The single-shaft combined cycle power plant includes a compressor 1, a gas turbine 3, a generator 5, a steam turbine 6, a condenser 7, a condensate pump 8, a waste heat recovery boiler 9, a combustor 11, a main steam regulating valve 12, and a steam regulating valve 13. The gas turbine 3, the steam turbine 6, and the generator 5 have rotating shafts thereof coupled together and are configured such that the gas turbine 3 and the steam turbine 6 are directly connected to the single generator 5. In addition, a pipe for supplying, for example, air to the compressor 1 is equipped with a compressor inlet guide vane control valve (IGV control valve) 2 for controlling the angle of a compressor inlet guide vane for adjusting the flow rate of a working fluid such as air. In addition, a fuel pipe of the combustor 11 is equipped with a fuel flow rate control valve 10 for adjusting the fuel flow rate.

In this configuration, the combustor 11 is supplied with compressed air compressed by the compressor 1 and fuel whose flow rate has been adjusted by the fuel flow rate control valve 10, and they are mixed and burned to generate combustion gas. This combustion gas flows into the gas turbine 3 to provide force for rotating the gas turbine 3. Thus, the torque of the gas turbine 3 is transferred to the generator 5 so that the generator 5 generates electricity.

The combustion gas that has done work through the gas turbine 3 is guided, in the form of exhaust gas 4, to the waste heat recovery boiler 9 downstream of the gas turbine 4 and is released to the atmosphere through a flue 15. The waste heat recovery boiler 9 recovers heat from the exhaust gas 4 to generate steam with feedwater from the condensate pump 8, high-pressure steam being guided into the steam turbine 6 through the main steam regulating valve 12 and low-pressure steam being guided into the steam turbine 6 through the steam regulating valve 13. The steam guided into the steam turbine 6 rotates the steam turbine 6. The torque of the steam turbine is transferred to the generator 5 so that the generator 5 generates electricity.

The steam that has done work through the steam turbine 6 is cooled and condensed by the downstream condenser 7, is guided, in the form of condensate, into the condensate pump 8, and is recirculated to the waste heat recovery boiler 9. The steam turbine 6, called a reheat turbine, has an intercept valve 14 for controlling reheat steam at a turbine inlet for reheat steam.

In normal operation, all steam generated by the waste heat recovery boiler 9 with the exhaust gas 4 from the gas turbine 3 is guided into the steam turbine 6, with the main steam regulating valve 12 and the steam regulating valve 13 for adjusting the amount of steam being fully open. In this state, load control is mainly performed by adjusting the amount of fuel supplied to the gas turbine 3 through the fuel flow rate control valve 10. The degree of opening of the fuel flow rate control valve 10 is adjusted on the basis of a fuel command value (CSO) appropriate for the deviation from the output of the generator 5 with respect to the output requested.

Figure 2:
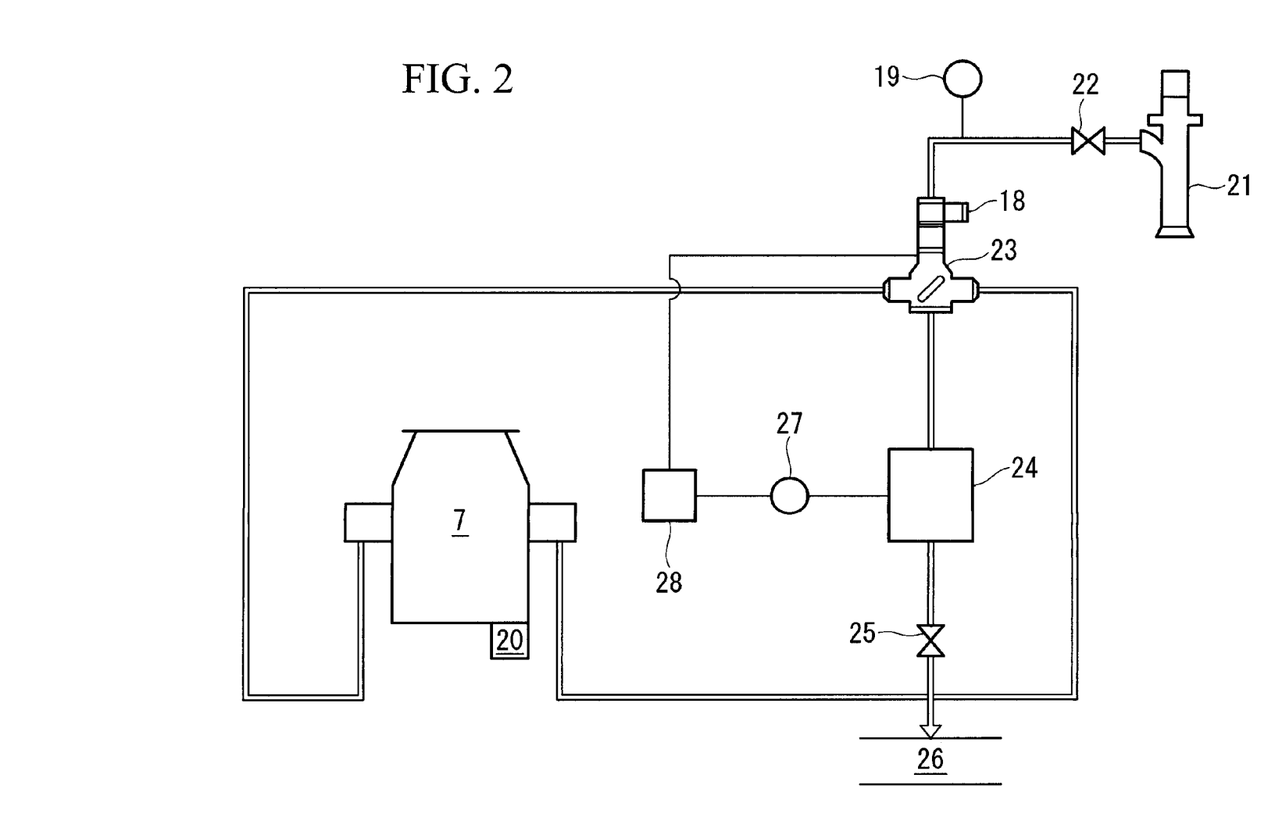
FIG. 2 is a circulating water system diagram of a condenser.

FIG. 2 is a circulating water system diagram of the condenser 7, where sea water is used as circulating water. First, sea water is pumped by a circulating water pump 21 and is introduced into an inlet water box of the condenser 7 through a circulating water pump discharge valve 22, a condenser reverse washing valve 23, etc. The sea water that has been used for cooling and condensing steam in the condenser 7 flows from an outlet water box of the condenser 7 through the condenser reverse washing valve 23 and then through a ball catcher 24, a condenser outlet valve 25, etc. and is released into a drain 26. The ball catcher 24 collects balls for cleaning tubes of the condenser 7, and the balls collected by the ball catcher 24 are sent to a ball-circulating pump 27 and are collected by a ball collector 28. The balls collected by the ball collector 28 are injected into the circulating water system upstream of the condenser reverse washing valve 23.

The condenser reverse washing valve 23 switches the circulating water system to switch the operation of the condenser 7 between reverse washing and normal washing. In reverse washing, the condenser reverse washing valve 23 is fully closed and operates so as to send the sea water pumped by the circulating water pump 21 to the output water box of the condenser 7. Thus, the sea water pumped by the circulating water pump 21 is introduced into the output water box of the condenser 7 through the circulating water pump discharge valve 22, the condenser reverse washing valve 23, etc. The sea water reversed through the condenser 7 flows from the inlet water box of the condenser 7 through the condenser reverse washing valve 23 and then through the ball catcher 24, the condenser outlet valve 25, etc. and is released into the drain 26.

Next, a gas turbine control system and method for the single-shaft combined cycle power plant will be described with reference to FIG. 3.

Figure 3:
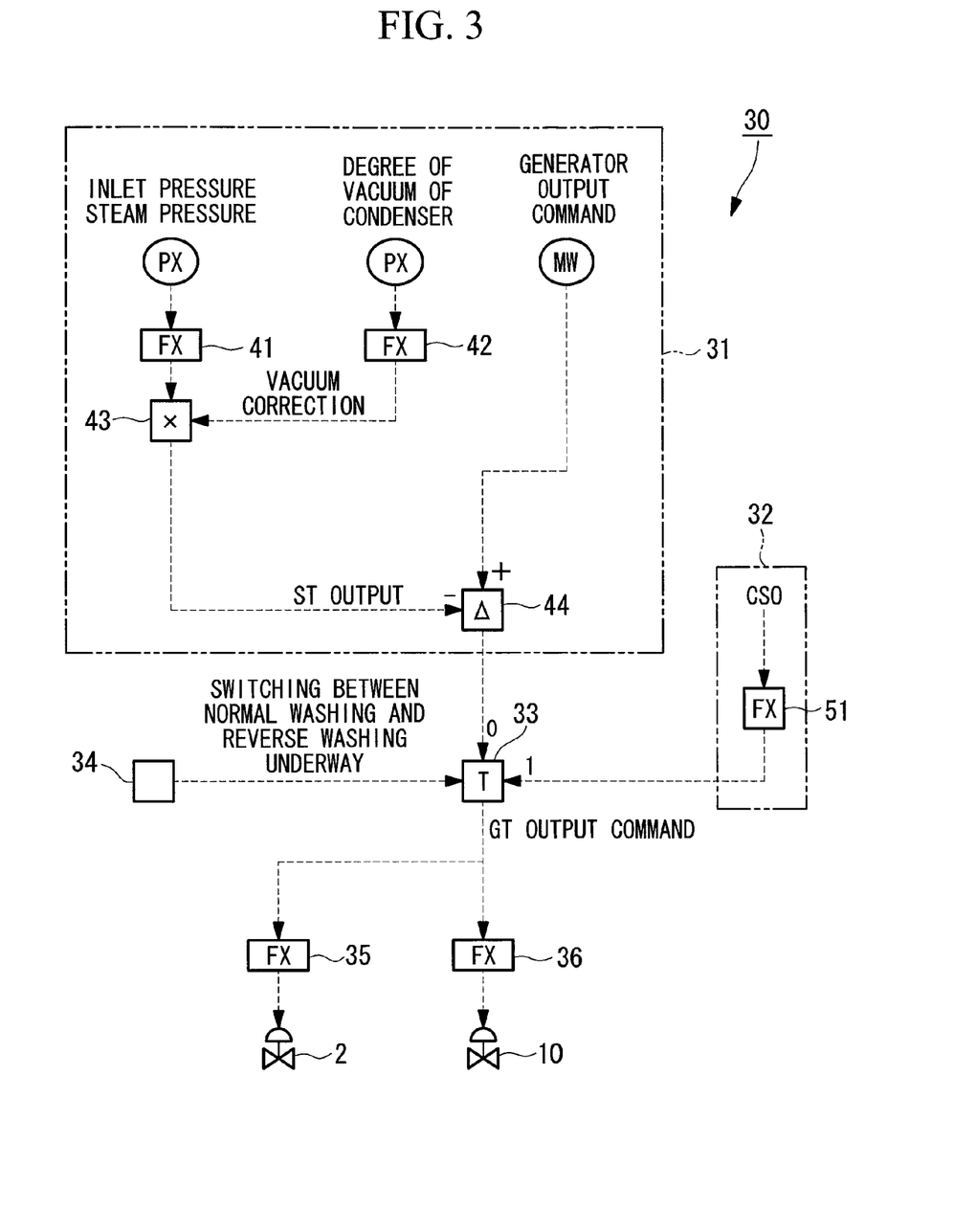
FIG. 3 is a control system diagram of a gas turbine control system according to the embodiment of the present invention.

FIG. 3 is a control system diagram of the gas turbine control system according to this embodiment. As shown in FIG. 3, a gas turbine control system 30 includes a first command-generating section 31 for generating a gas turbine output command by subtracting the steam turbine output from a requested output command for the generator 5, a second command-generating section 32 for generating a gas turbine output command using a parameter reflecting the gas turbine output, a selection section 33 for selecting the second command-generating section 32 during a reverse-washing/normal-washing switching period of the condenser 7 and selecting the first command-generating section during a period other than the reverse-washing/normal-washing switching period of the condenser 7, and a status-determining section 34 for determining whether or not the condenser 7 is currently in the reverse-washing/normal-washing switching period and outputting a signal corresponding to the determination result.

The first command-generating section 31 includes function generators 41 and 42, a multiplier 43, and a subtractor 44 as major components.

Figure 4:
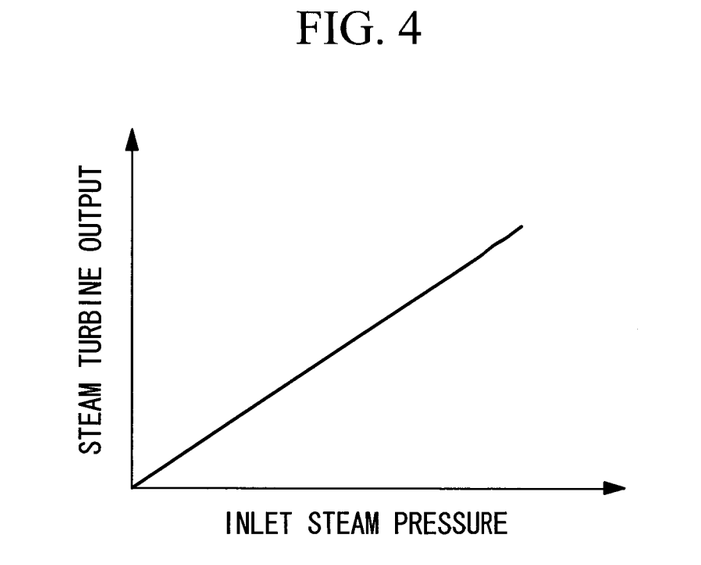
FIG. 4 is a graph showing an example of a characteristic diagram that associates inlet steam pressure with steam turbine output.

The inlet steam pressure of the steam turbine 6 is input to the function generator 41. The inlet steam pressure used is, for example, a steam pressure measured by a pressure sensor provided downstream of the intercept valve 14 disposed in the steam turbine 6. The function generator 41 possesses a characteristic diagram, shown in FIG. 4, that associates the inlet steam pressure with the steam turbine output, and by referring to the characteristic diagram, calculates the steam turbine output from the inlet steam pressure and outputs the steam turbine output to the multiplier 43.

Figure 5:
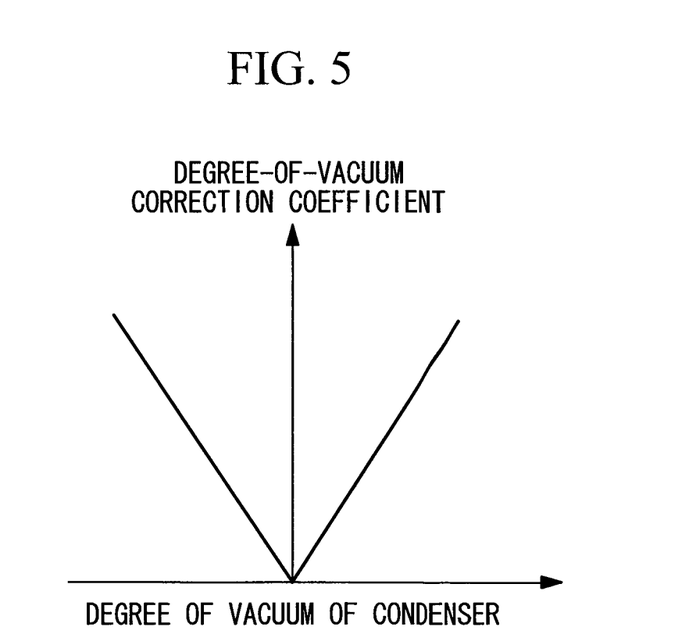
FIG. 5 is a graph showing an example of a characteristic diagram that associates the degree of vacuum of the condenser with vacuum correction coefficient.

The degree of vacuum of the condenser 7 is input to the function generator 42. The function generator 42 possesses a characteristic diagram, shown in FIG. 5, that associates the degree of vacuum of the condenser with a vacuum correction coefficient, and by referring to the characteristic diagram, calculates the vacuum correction coefficient from the degree of vacuum of the condenser and outputs the calculated vacuum correction coefficient to the multiplier 43.

The multiplier 43 corrects the steam turbine output, which has been input from the function generator 41, by multiplying the steam turbine output by the vacuum correction coefficient input from the function generator 42 and outputs the corrected steam turbine output to the subtractor 44.

The subtractor 44 calculates the gas turbine output command by subtracting the corrected steam turbine output, which has been input from the multiplier 43, from a generator output command generated by another system and outputs the gas turbine output command to the selection section 33.

Figure 6:
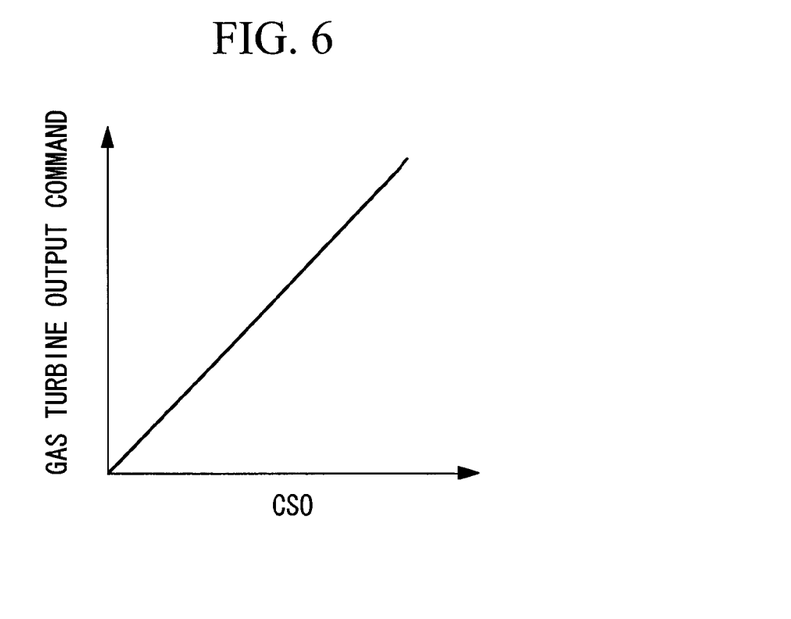
FIG. 6 is a graph showing an example of a characteristic diagram that associates fuel command value CSO with gas turbine output command.

The second command-generating section 32 generates the gas turbine output command using a parameter reflecting the gas turbine output. Specifically, the second command-generating section 32 includes a function generator 51 as a major component. A fuel command value CSO related to the control of the amount of fuel supplied to the combustor 11 is input to the function generator 51. The function generator 51 possesses a characteristic diagram, shown in FIG. 6, that associates the fuel command value CSO with the gas turbine output command, and by referring to the characteristic diagram, calculates the gas turbine output command from the fuel command value CSO and outputs the calculated gas turbine output command to the selection section 33.

Figure 7:
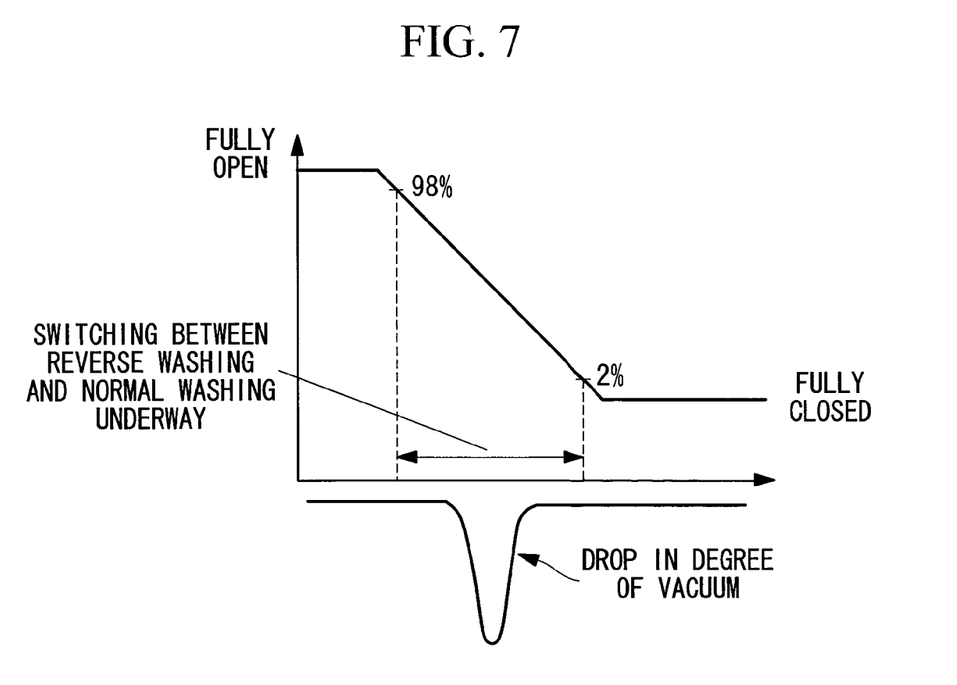
FIG. 7 is a graph for illustrating a method of determination in a status-determining section.

The status-determining section 34 determines whether or not the condenser 7 is currently switching between reverse washing and normal washing and outputs a signal corresponding to the determination result to the selection section 33. Specifically, the reverse-washing-status determining section 34 determines whether or not switching between reverse washing and normal washing is underway on the basis of the degree of opening of the condenser reverse washing valve 23. Specifically, as shown in FIG. 7, switching between reverse washing and normal washing is determined to be underway during a period when the condenser reverse washing valve 23 is shifting from a fully open state to a fully closed state and during a period when the condenser reverse washing valve 23 is shifting from a fully closed state to a fully open state.

More specifically, if the degree of valve opening of the condenser revere washing valve 23 falls within the range of 2% to 98%, the status-determining section 34 recognizes as switching between reverse washing and normal washing is underway and outputs a signal indicating that switching between reverse washing and normal washing is underway to the selection section 33.

The selection section 33 selects and outputs the gas turbine output command input from the second command-generating section 32 while the signal being input from the status-determining section 34, indicates that switching between reverse washing and normal washing is underway, and selects and outputs the gas turbine output command input from the first command-generating section 31 while the signal indicating that switching between reverse washing and normal washing is underway is not being input.

The gas turbine output command output from the selection section 33 is output to a controller 35 for controlling the angle of the compressor inlet guide vane (IGV control valve) 2 provided in the air pipe for supplying air to the compressor 1 and a controller 36 for controlling the degree of opening of the fuel flow rate control valve 10 for adjusting the flow rate of fuel to the combustor 11.

The controller 35 possesses, for example, a characteristic diagram that associates the gas turbine output command with the angle of the compressor inlet guide vane, and by referring to the characteristic diagram, calculates the angle of the compressor inlet guide vane from the gas turbine output command and controls the compressor inlet guide vane control valve 2 to tilt the compressor inlet guide vane to the calculated angle.

In addition, the controller 36 possesses, for example, a characteristic diagram that associates the gas turbine output command with the fuel command value CSO, and by referring to the characteristic diagram, calculates the fuel command value CSO and controls the degree of opening of the fuel flow rate control valve 10 on the basis of the fuel command value CSO.

As described above, with the gas turbine control system and method for the single-shaft combined cycle plant according to this embodiment, the gas turbine output command is generated on the basis of a parameter reflecting the output of the gas turbine, such as the fuel command value CSO related to the control of the amount of fuel supplied to the combustor 11, without taking the steam turbine output into account during the switching of the condenser 7 between reverse washing and normal washing. This allows an appropriate gas turbine output command to be generated without being affected by a decrease in steam turbine output due to a decrease in the degree of vacuum of the condenser 7 occurring during the switching of the condenser 7 between reverse washing and normal washing (see FIG. 7). As a result, it is possible to achieve a stable generator output during the switching between reverse washing and normal washing and to prevent malfunctions of various equipment due to miscalculation of the gas turbine output command.

In addition, because the angle of the compressor inlet guide vane 2 and the degree of opening of the fuel flow rate control valve 10 are adjusted on the basis of the gas turbine output command determined as above, the angle of the compressor inlet guide vane 2 can be optimally controlled to improve the partial load efficiency of the single-shaft combined cycle power plant, and the degree of opening of the fuel flow rate control valve 10 can be optimally controlled to prevent an accidental fire and therefore to improve the reliability of the gas turbine 3.

Figure 8:
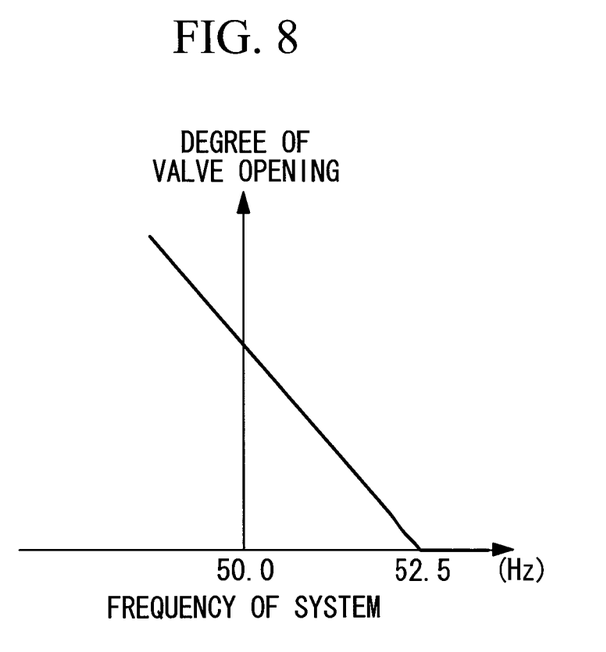
FIG. 8 is a graph for illustrating governor-free control.

Furthermore, in the control of the gas turbine according to this embodiment, governor-free control is performed so that the degree of valve opening of the fuel flow rate control valve 10 becomes fully closed when, as shown in FIG. 8, the frequency of the power system reaches or exceeds a certain value (in this case, 52.5 Hz). Since the gas turbine output command is generated on the basis of the fuel command value CSO related to the control of the amount of fuel, the gas turbine control system and method according to this embodiment has the advantage that, even if the above governor-free control changes the fuel command value CSO related to the control of the amount of fuel during the switching of the condenser 7 between reverse washing and normal washing, the gas turbine output command can be generated so as to follow that change.

Although the case where the second command-generating section 32 generates the gas turbine output command on the basis of the fuel command value CSO has been described in the above embodiment, this is not limited thereto; for example, the gas turbine output command may be generated on the basis of the gas turbine inlet temperature.

REFERENCE SIGNS LIST

1 compressor
2 compressor inlet guide vane control valve
3 gas turbine
5 generator
6 steam turbine
7 condenser
8 condensate pump
9 waste heat recovery boiler
10 fuel flow rate control valve
11 combustor
12 main steam regulating valve
13 steam regulating valve
14 intercept valve
30 gas turbine control system
31 first command-generating section
32 second command-generating section
33 selection section
34 status-determining section
41, 42, 51 function generator
43 multiplier
44 subtractor
35, 36 controller

The invention claimed is:

1. A gas turbine control system for a single-shaft combined cycle plant comprising a gas turbine, a steam turbine, a generator, and a condenser for condensing exhaust steam from the steam turbine, wherein the gas turbine, the steam turbine, and the generator have rotating shafts thereof coupled together, the gas turbine control system further comprising:
a first command-generating section for generating a first gas turbine output command on the basis of the output of the generator and an output of the steam turbine;
a second command-generating section for generating a second gas turbine output command using a parameter reflecting an output of the gas turbine; and
a selection section for selecting and outputting the second gas turbine output command during a reverse-washing/normal-washing switching period of the condenser, and for selecting and outputting the first gas turbine output command during a period other than the reverse-washing/normal-washing switching period of the condenser, wherein the control system is configured to determine that the condenser is in the reverse-washing/normal-washing switching period when a position of a condenser reverse washing valve of the plant falls within the range of 2 to 98% open.

2. The gas turbine control system for the single-shaft combined cycle plant according to claim 1, wherein the fuel command value is a command value related to control of the amount of fuel supplied to a combustor or the inlet temperature of the gas turbine.

3. A gas turbine control method for a single-shaft combined cycle plant comprising a gas turbine, a steam turbine, a generator, and a condenser for condensing exhaust steam from the steam turbine, wherein the gas turbine, the steam turbine, and the generator have rotating shafts thereof coupled together,
the control method including:
generating a first gas turbine output command on the basis of an output of the generator and an output of the steam turbine;
generating a second gas turbine output command using a parameter reflecting an output of the gas turbine; and
selecting and outputting the second gas turbine output command during a reverse-washing/normal-washing switching period of the condenser upon a determination that a position of a condenser reverse washing valve of the plant falls within the range of 2 to 98% open, and the first gas turbine output command during a period other than the reverse-washing/normal-washing switching period of the condenser.

\* \* \* \* \*